Jan. 12, 1932.  F. B. ROBB  1,840,973
AEROPLANE LANDING DEVICE
Filed May 5, 1930
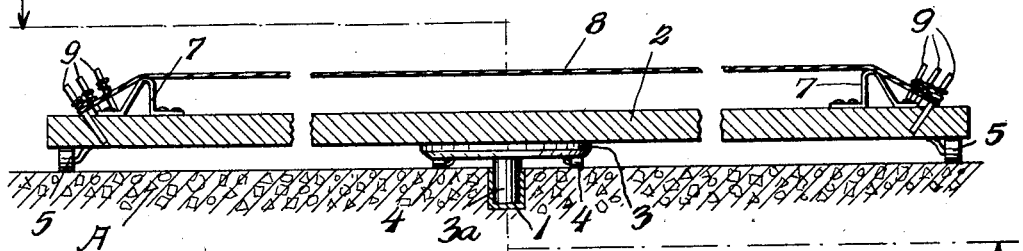
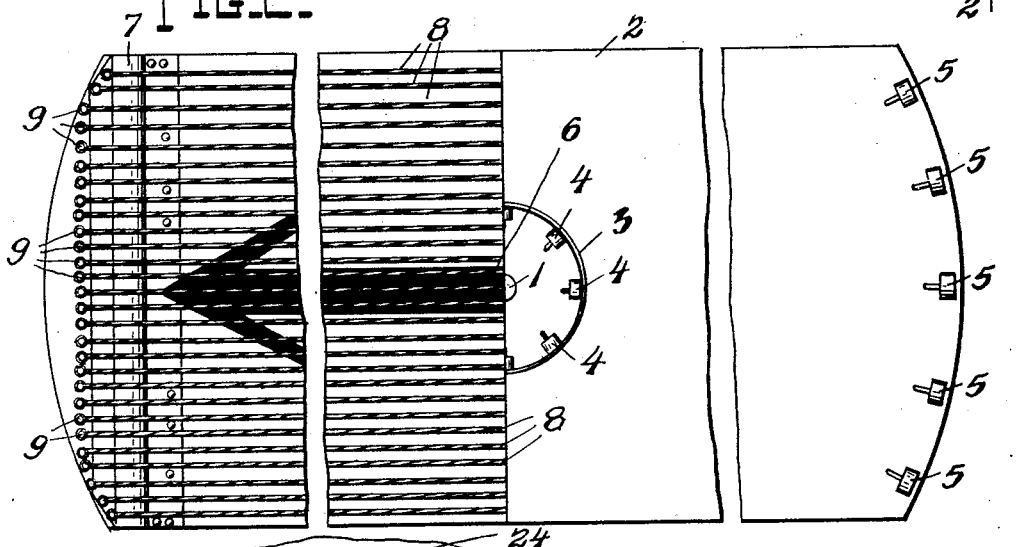
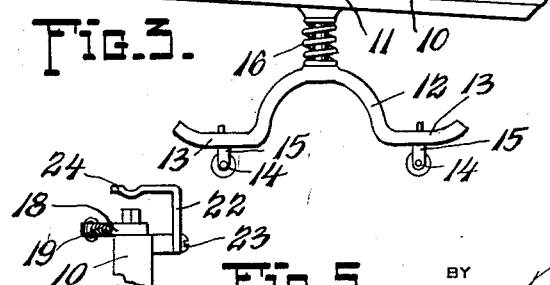
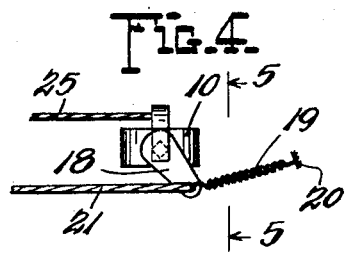
INVENTOR
F. B. Robb
BY
Robbs Robb
ATTORNEYS Patented Jan. 12, 1932

1,840,973

UNITED STATES PATENT OFFICE

FRANK B. ROBB, OF CLEVELAND HEIGHTS, OHIO

AEROPLANE LANDING DEVICE

Application filed May 5, 1930. Serial No. 449,906.

Present construction of heavier-than-air craft necessitates that such craft make landings at a considerably high rate of speed. This in turn entails a construction of large landing fields to permit the aeroplanes to come to a rest. In order to make landings possible in more limited spaces, various devices have been devised for arresting the aeroplanes after they have travelled a short distance. One of the most common of these devices has been the application of brakes to the front wheels. This use of brakes has made landings possible in more restricted places, but if the brakes are applied too quickly or with too much force, the aeroplane very often noses over, thus causing great damage to the plane itself and the operators and passengers thereof.

The underlying thought of my invention, therefore, is to provide means associated with the landing field and with the tail skid of an aeroplane whereby the tail skid is held in close proximity to the landing field, thereby preventing nosing over of the aeroplane no matter how quickly the brakes are applied thereto.

In the preferred form of my invention, I employ a rotatable landing platform which is equipped with parallel spaced members preferably in the form of cables or wires. These cables or wires are spaced sufficiently far apart to permit the entrance of the aeroplane wheels therebetween.

The tail skid of an aeroplane which is to be used in conjunction with my novel landing device is provided with means which allow the tail skid to enter between the wires but which upon suitable operation by the pilot will be expanded so that the tail skid is unable to rise above the cables. If the brakes are then applied to the aeroplane, it can readily be seen that engagement of the tail skid with the undersides of the cables will prevent lifting up of the tail of the aeroplane, which in turn eliminates any possibility of nosing over.

A further object of my invention is to provide suitable indicating means, audible or otherwise, which means will be operable upon contact of the tail skid with the landing device to inform the pilot that such contact has been made. Having thus been informed that the tail skid is contacting the landing device, the pilot may operate the expanding means of the tail skid as above set forth, being assured that the tail skid is underneath the wires or cables.

Further and more detailed objects of my invention will become apparent as the description thereof proceeds.

In the drawings

Figure 1 is a sectional view in side elevation of the preferred form of my invention.

Figure 2 is a sectional view taken about on the line 2—2 of Figure 1.

Figure 3 is an enlarged detail view with parts in section, of a tail skid constructed in accordance with my invention.

Figure 4 is a plan view of the same, taken about on the line 4—4 of Figure 3.

Figure 5 is a fragmentary view of a portion of my novel tail skid, and is taken about on the line 5—5 of Figure 4.

While a preferred, specific embodiment of the invention is herein set forth, it is to be understood that I am not to be limited to the exact constructions illustrated and described, because various modifications of these details may be provided in putting the invention into practice within the purview of the appended claims.

The concrete base is shown at A and is preferably used in conjunction with my landing device and has a receptacle or cup shaped member 1 embedded therein at its central portion. A landing platform made of wood or any other suitable material and being substantially rectangular in shape is provided on the bottom near its center with a plate 3 having a cylindrical extension 3a which is received by the cup 1. The plate 3 is also provided with rollers 4 which contact the concrete A. Similar rollers 5 are also mounted on the underside of the platform 2 so that the same may be readily rotated. The platform is made rotatable so that a pilot may always land into the wind, and an indicating means such as an arrow 6 is associated with the upper part of the platform to indicate the proper direction of landing.

A channel shaped member 7 is secured to the platform 2 across each end for supporting spaced cables or wires 8. The ends of the cables or wires 8 may be secured in any desirable manner such as by the pins 9 inserted into the platform wheel, and rotative to tighten the wires.

Referring now to Figures 3, 4 and 5, the bracket 10 is secured to the fuselage of the aeroplane and is provided with openings for receiving a shaft 11 which comprises a part of my novel tail skid. To the lower end of the shaft 11 is affixed a semi-circular member 12 having horizontally extending portions 13. Each of the portions 13 is provided with a roller 14 which rotates in a bracket 15 rotatably mounted in the portion 13. Interposed between the member 12 and the bracket 10 and around the shaft 11 is a coil spring 16 which tends to move the shaft 11 in a downward direction. The shaft 11 is also provided with an enlargement 17 which bears against the bracket 10, thereby limiting the downward movement just described. Above the enlargement 17 the shaft 11 is made square so as to readily receive an operating lever 18. A spring 19 having one end secured to the aeroplane fuselage at 20 and the other end to the free end of the lever 18, holds the tail skid in the position shown in Figure 3. In this position the longitudinal axis of the tail skid is parallel to that of the fuselage. The lever 18 is also provided with an operating cable 21 under the control of the pilot, whereby the tail skid may be rotated through an angle preferably not greater than 90°. Suitable stops may be arranged to limit the movement of the lever 18. A contact member 22 is secured to the bracket 10 by means of a screw 23 and has a horizontal portion 24 which extends over the upper end of the shaft 11 by use of contact therewith when said shaft is in its normal position under influence of the spring 16. Suitable electrical connection including a cable 25 is associated with the contact 22 and shaft 11. It can readily be seen that when the tail skid engages the platform 2, the spring 16 will be compressed, allowing the shaft 11 to engage the contact 22 to complete an electrical circuit. Any suitable indicating means such as a light may be included in this circuit to indicate to the pilot that the tail skid is in contact with the platform.

The operation of my tail skid and landing device is thought to be clear from the foregoing. However, a short explanation of the same will now be given. When an aeroplane is about to land, the platform is first rotated until the arrow points in the direction from which the wind is coming. The pilot then sets his plane down on the platform, the wheels and tail skid entering the spaces between the wires or cables 8. Upon contact of the tail skid with the platform, the electrical circuit will be completed whereupon indicating means, not shown, will inform the pilot that the tail skid may now be turned. Operation of cable 21 will turn the tail skid to the position shown in Figure 8 wherein the portions 13 engage the underside of the cables 8. If the brakes are now applied to the aeroplane, the cables 8 will hold the tail skid in close proximity to the platform 2, thereby preventing nosing over of the aeroplane.

Having thus described my invention, what I claim as new and desire to secure by Letters Patent of the United States, is—

1. Aeroplane tail skid construction comprising, a bracket, a member rotatably mounted therein, and a cross piece secured to the lowermost portion of said member, whereby, upon rotation of the member the cross piece is shifted from a direction parallel to the axis of the aeroplane to a direction at an angle to said axis.

2. Aeroplane tail skid construction comprising, a bracket, a member rotatably mounted therein, a cross piece secured to the lowermost portion of the member, and means operable by the pilot of the aeroplane for rotating said member whereby the cross piece is shifted from a direction parallel to the axis of the aeroplane to a direction at an angle to said axis.

3. In combination, an aeroplane tail skid construction comprising a bracket, a member rotatably mounted therein, a cross piece secured to the lowermost portion of said member, whereby upon rotation of the member the cross piece is shifted from a direction parallel to the axis of the aeroplane to a direction at an angle to said axis, means associated with a landing platform for engaging with the said cross piece, the said means comprising parallel spaced tensioned cables carried by the landing platform and spaced above it at a suitable distance, and means operable by the pilot of the aeroplane for rotating the cross piece to engage it under the said cables as the aeroplane lands upon the platform to prevent nosing over of the plane as braking means are applied to the usual landing devices thereof.

4. In combination, an aeroplane tail skid construction comprising a bracket, a member rotatably mounted therein, a cross piece secured to the lowermost portion of the said member, whereby upon rotation of the member the cross piece is shifted from a direction parallel to the axis of the aeroplane to a direction at an angle to the said axis, means associated with a landing platform for engaging with the said cross piece, the said means comprising parallel spaced tensioned cables carried by the landing platform, and spaced above it at a suitable distance, means operable by the pilot of the aeroplane for rotating the cross piece to engage it under the cables as the aeroplane lands upon the platform to prevent nosing over of the plane as braking means are applied to the landing devices thereof, and instrumentalities for signalling the pilot when the engagement is made, the instrumentalities comprising a signalling device for the pilot, an electrical circuit including the device, and means on the platform for automatically closing the circuit when the engagement with the cable is made.

5. In combination, an aeroplane, a tail skid and landing gear therefor, the landing gear comprising the usual landing wheels and braking instrumentalities therefor, a landing platform comprising a plurality of longitudinally stretched cables, and means on the tail skid under control of the aeroplane operator for interlocking with the cables as the aeroplane lands to hold the tail skid down while permitting unobstructed application of the brakes to the wheels.

6. In combination, an aeroplane, a tail skid therefor and landing gear therefor, the landing gear comprising the usual landing wheels and braking instrumentalities therefor, a landing platform comprising a plurality of longitudinally stretched cables, means on the tail skid under control of the aeroplane operator for transversely engaging the underside of the cables for interlocking therewith as the aeroplane lands to hold the tail skid down while permitting unhampered application of the brakes to the wheels, and signalling means operable upon contact of the said means on the tail skid with the cables for indicating such contact to advise the operator to apply the brakes.

In testimony whereof I affix my signature.

FRANK B. ROBB.